(12) United States Patent
Rua et al.

(10) Patent No.: US 8,339,112 B2
(45) Date of Patent: Dec. 25, 2012

(54) ANALOG MPPT CIRCUIT FOR PHOTOVOLTAIC POWER PLANT

(75) Inventors: Francesco Rua, Catania (IT); Salvatore Giuseppe Privitera, Catania (IT); Tiziana Teresa Signorelli, Aci Bonaccorsi (IT); Francesco Pulvirenti, Acireale (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 365 days.

(21) Appl. No.: 12/828,736

(22) Filed: Jul. 1, 2010

(65) Prior Publication Data

US 2011/0001360 A1    Jan. 6, 2011

(30) Foreign Application Priority Data

Jul. 2, 2009  (IT) ............... VA2009A0042

(51) Int. Cl.
*G05F 1/00* (2006.01)

(52) U.S. Cl. ........................ 323/222; 323/282

(58) Field of Classification Search ........... 323/906, 323/222, 282; 363/15
See application file for complete search history.

(56) References Cited

U.S. PATENT DOCUMENTS

| | | | | |
|---|---|---|---|---|
| 6,043,633 | A * | 3/2000 | Lev et al. | 323/222 |
| 7,102,341 | B1 * | 9/2006 | Choudhury | 323/285 |
| 7,595,623 | B2 * | 9/2009 | Bennett | 323/288 |
| 7,906,943 | B2 * | 3/2011 | Isobe et al. | 323/223 |
| 7,965,071 | B2 * | 6/2011 | Saitoh | 323/288 |
| 8,130,522 | B2 * | 3/2012 | Maksimovic | 363/89 |
| 2003/0066555 | A1 * | 4/2003 | Hui et al. | 136/246 |
| 2005/0219872 | A1 * | 10/2005 | Lys | 363/21.04 |
| 2008/0290846 | A1 * | 11/2008 | Kanouda et al. | 323/222 |

FOREIGN PATENT DOCUMENTS

| | | |
|---|---|---|
| EP | 0947904 | 10/1999 |
| WO | 2007/141823 | 12/2007 |

* cited by examiner

*Primary Examiner* — Adolf Berhane
*Assistant Examiner* — Emily Pham
(74) *Attorney, Agent, or Firm* — Allen, Dyer, Doppelt, Milbrath & Gilchrist, P.A.

(57) ABSTRACT

A method of power point tracking for operating a photovoltaic power plant, which includes a DC-DC converter of the output voltage of a panel having a power switch driven by a PWM control signal of variable duty-cycle generated by a PWM control circuit, in discontinuous conduction mode or continuous conduction mode depending on the current load of the converter, is implemented by low cost analog circuits. The method does not require the use of any analog-to-digital conversion, digital processing or storage resources and may use a single voltage sensor.

22 Claims, 6 Drawing Sheets

US 8,339,112 B2

ANALOG MPPT CIRCUIT FOR PHOTOVOLTAIC POWER PLANT

FIELD OF THE DISCLOSURE

This disclosure relates to photovoltaic panel power plants and, in particular, to the techniques for maximum power point tracking (MPPT). The disclosed MPPT technique is effective in power plants wherein generated energy is stored in a battery array or is absorbed from the output of a DC-DC step-up converter at an output voltage relatively stable in the short term.

BACKGROUND OF THE DISCLOSURE

The cost of photovoltaic (PV) power plants is still high while energy conversion efficiency remains low. Besides the fact that the output power that solar panels can deliver varies with solar radiation, it also depends of how power is being transferred to the load. In other words, solar panels can deliver the maximum power only at specific working points of their V-I characteristics.

Maximizing the power delivered by PV panels under changing load conditions may be desirable. During the last several decades, several methods have been proposed to track the maximum power point of a PV panel array [1], [2], [3]. Most of them are based on a "perturb and observe" (P&O) algorithm usually carried out by either a micro-controller or a DSP [4], [5], [6], [7], [8]. Moreover, only few methods are able to track the MPP using only one sensor [4], [7], [8]. P&O based MPP trackers are typically implemented by a DSP/μC in a feedback loop of a DC-DC converter, whose duty cycle (D) is controlled in such a way as to maximize the power derivable from the PV panel by an electrical load according to a basic scheme as shown in FIG. 1. In practice, controlling (varying) the duty cycle of the DC-DC converter is equivalent to perturb the voltage $V_{PV}$ and thus the power extracted from the PV panel.

The voltage across the PV panel terminals, $V_{PV}$, and the delivered current, $I_{PV}$, are periodically measured and converted into digital words. Then their multiplication ($V_{PV}*I_{PV}$) is executed to obtain the power currently extracted from the panel and the value obtained is compared with a previously calculated and stored value of output power in order to set the sign of increment of the duty cycle of the PWM drive signal of the power switch of the DC-DC converter that determined the observed variation of the output power. If that variation is greater than zero, the sign is kept unchanged, otherwise it is inverted.

The flowchart of such a typical digital MPPT control is depicted in FIG. 2. This control uses two sensors for measuring both the voltage at the panel terminals and the current needed for calculating the power currently yielded from the PV panel. And thus two analog to digital conversions may be needed too.

Furthermore, current measurement implies the connection of a resistance in series between a PV panel terminal and the DC-DC converter and its value is a trade off between conversion efficiency and measurement accuracy. Therefore, current monitoring may become difficult at low power rates, when the current drawn from PV panels is relatively small.

As interest is in assessing power variation rather than its absolute value, a stable approximation of the current power yield could be used if the DC-DC converter works in the so-called Discontinuous Conduction Mode (DCM), in view of the proportionality that exists between $I_{PV}$ and the duty cycle D in these conditions of operation of the voltage step-up and stabilization DC-DC converter. Therefore, the product between D and $V_{PV}$ can be used as representing approximately the current output power [7], using only one sensor, namely a voltage sensor, which does not use introduction of a series connected resistance that would penalize conversion efficiency.

Another consideration is that, if the PV generation plant is exploited as a battery charger or in any other equivalent application, including grid connection and alike, where the output voltage of the DC-DC converter can be considered constant in the short term, the input power delivered to the converter by the PV panel, is substantially proportional to the output power (because output/input power ratio of the DC-DC converter can be considered approximately constant) that can be expressed as the product between $V_{OUT}$ (which is considered constant) and the output current $I_{OUT}$ [8].

However, a current sensor is used, which suffers from the above noted drawback of needing a dissipative series resistance. Moreover, an analog to digital conversion (ADC) is needed as well, because of the digital processing (mainly multiplications and power data storage) contemplated by the MPPT control algorithm. Notwithstanding the relative simplicity of the digital processing that is used, a working frequency higher than the switching frequency of the DC-DC converter may be provided. Moreover, the ADC can represent a crucial part of the whole design, as its resolution strictly relates to circuit complexity and control accuracy. Some P&O based, analog MPP trackers have been disclosed in literature [9], [10]. In these articles, an analog multiplier is used to evaluate the power ($V_{PV}*I_{PV}$), eliminating the need of analog to digital conversion hardware; however two sensors may be needed.

In [10], a constant current, proportional to the power delivered by the panel(s), to the DC-DC converter, charges a capacitor during a first portion of the sampling period and discharges it during a second portion of the sampling period; then, in the third and last portion of the sampling period, the amount of charge left in the capacitor feeds a comparator whose output provides a digital signal indicating whether the power is increasing or decreasing.

SUMMARY OF THE DISCLOSURE

An effective method of maximum power point tracking (MPPT) for operating a photovoltaic power plant that may include at least a DC-DC converter of the output voltage ($V_{PV}$) of a single panel or of a plurality of series-parallel interconnected panels, and a power switch driven by a PWM control signal ($V_{PWM}$) of variable duty-cycle (D) generated by a PWM control circuit, in discontinuous conduction mode (DCM) or continuous conduction mode (CCM) depending on the current load of the converter, has now been found, which may be implemented by simple low cost analog circuits. The method may not require the use of any analog-to-digital conversion, digital processing or storage and may use only a single voltage sensor, in other words, no dissipative sensing resistance needs to be introduced.

For example, the method may comprise i) detecting, verifying and acknowledging entry in discontinuous conduction mode (DCM) of the DC-DC converter; ii) multiplying the current output voltage ($V_{PV}$) by a quantity corresponding to the time ratio of the current duty-cycle of the PWM drive signal of the converter, for producing an analog signal ($V_{PV}*D$) that approximately corresponds to the power currently yielded from the panel or panels when the converter is functioning in discontinuous conduction mode (DCM); iii) analog multiplying a periodically sampled, voltage drop (Vmosfet) on the power switch of the converter during conduction phases driven by the PWM drive signal by a predetermined voltage gain factor and low pass filtering the resulting signal for producing an analog product signal (Vcp*(1−D)) that approximately corresponds to the power currently absorbed by an electrical load of the converter when functioning in continuous conduction mode (CCM); iv) comparing a first input signal selected between the signals produced in ii) and iii) as representing the currently absorbed power (Vpower) with a second input signal in the form of a delayed replica or a time averaged value of the same signal (Vpower) for outputting a flag (Vchange) when the delayed replica or time averaged value becomes greater than the current value; v) inverting the sign of variation of the duty-cycle of the PWM control signal when the delayed replica or a time averaged value becomes greater than the current value.

An important embodiment of an analog circuit adapted to force the duty cycle of the PWM drive signal ($V_{PWM}$) of the power switch of the DC-DC converter to invert the sign of variation for tracking the maximum power point of functioning of the PV power plant may comprise: a) means for signaling or a module for generating a signal for whether the DC-DC converter is working in discontinuous conduction mode (DCM) or in continuous conduction mode (CCM); b) a first analog multiplier circuit of the current output voltage ($V_{PV}$) by a quantity corresponding to the time ratio of the current duty-cycle (D) of the drive signal of the power switch of converter for producing a signal ($V_{PV}*D$) representing the current power yielded from the PV panel or panels when the converter is functioning in discontinuous conduction mode (DCM); c) a charge pump input stage of a periodically sampled voltage drop (Vmosfet) on the power switch of the converter during conduction phases, for producing an output voltage (Vcp), and a second analog multiplier circuit of the charge pump output voltage (Vcp) by a quantity corresponding to the complementary value (1−D) of the time ratio of the current duty-cycle (D) of the drive signal of the power switch of converter for producing a product signal (Vcp*(1−D)) representing the power currently absorbed by the load of the converter when functioning in continuous conduction mode (CCM); d) an analog maximum power tracking circuit core including a comparator of a first input signal (Vpower) selected between the signals produced by b) and c) with a delayed replica or time averaged value of the same signal, for producing an output flag (Vchange) when the delayed replica or time averaged value becomes greater than the current value; and e) means for inverting or an inverter for inverting the sign of variation of the duty-cycle of the PWM drive signal in controlled by the flag.

DETAILED DESCRIPTION OF THE PREFERRED EMBODIMENTS

Figure 1:
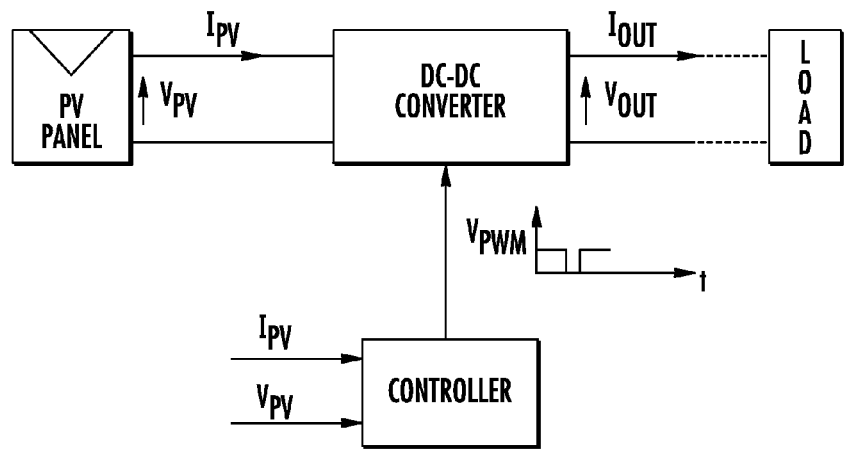
FIG. 1 is a block diagram of a photovoltaic energy conversion system, according to the prior art.
Figure 2:
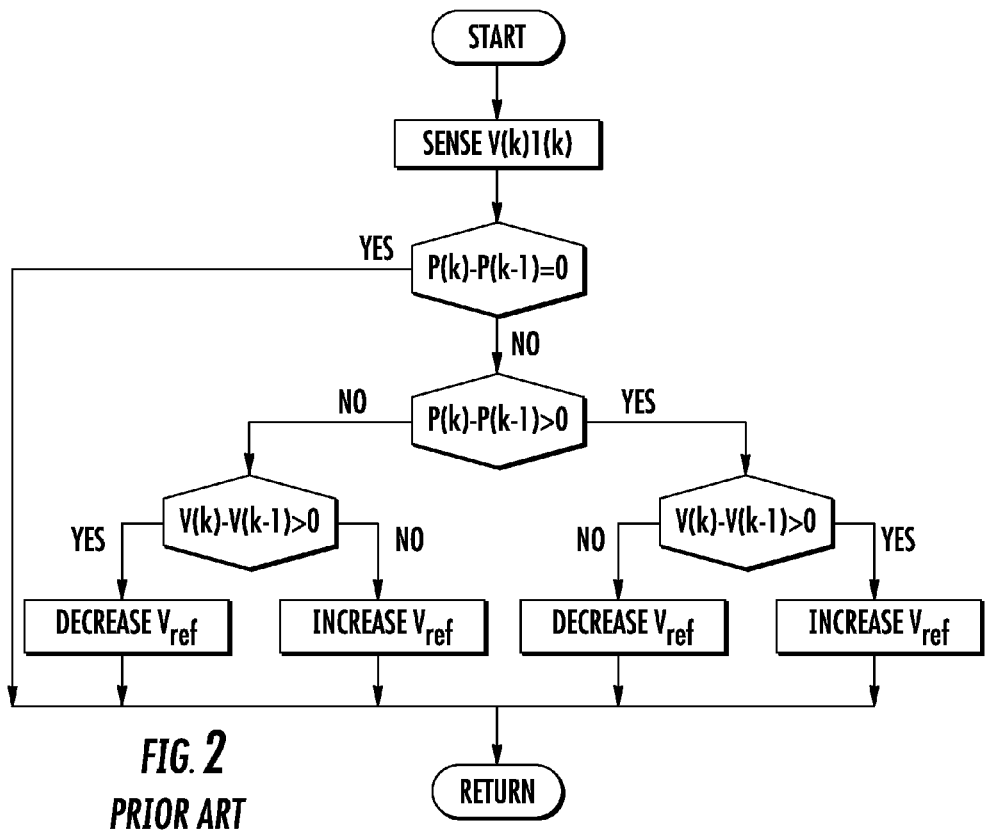
FIG. 2 is a flowchart of a digital P&O based MPPT control, according to the prior art.
Figure 3:
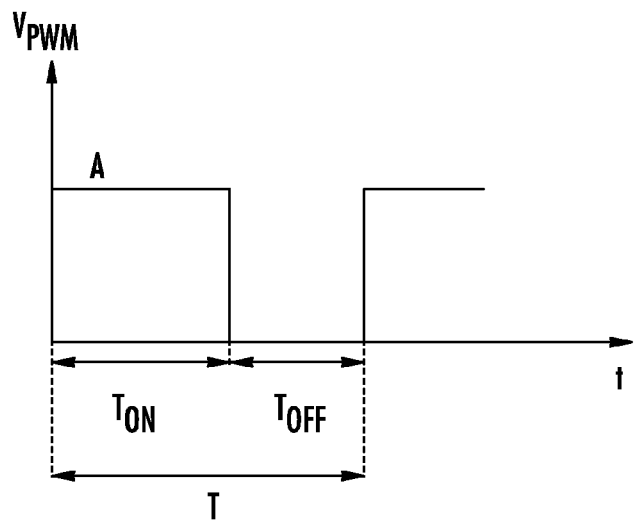
FIG. 3 is a PWM driving signal waveform, according to the present invention.

The duty cycle D of the power switch of a DC-DC converter is controlled by a Pulse Width Modulated (PWM) driving signal, $V_{PWM}$. The ratio between the ON time and the whole period of the waveform is D, as shown in FIG. 3.

Monitoring of Power Extracted from the PV Panel
If the amplitude of the PWM driving signal is A and if it is applied to a low-pass filter, the resulting signal may be a constant voltage proportional to the product A*D as far as ripple can be neglected. Moreover the PWM signal may be used to switch the voltage between $V_{PV}$ and ground at the input of the same low-pass filter, such that the resulting output signal is a constant voltage proportional to $V_{PV}*D$ with negligible ripple. The product signal represents the power currently yielded from the PV panel or panels when the converter is functioning in discontinuous conduction mode (DCM).

Figure 4:
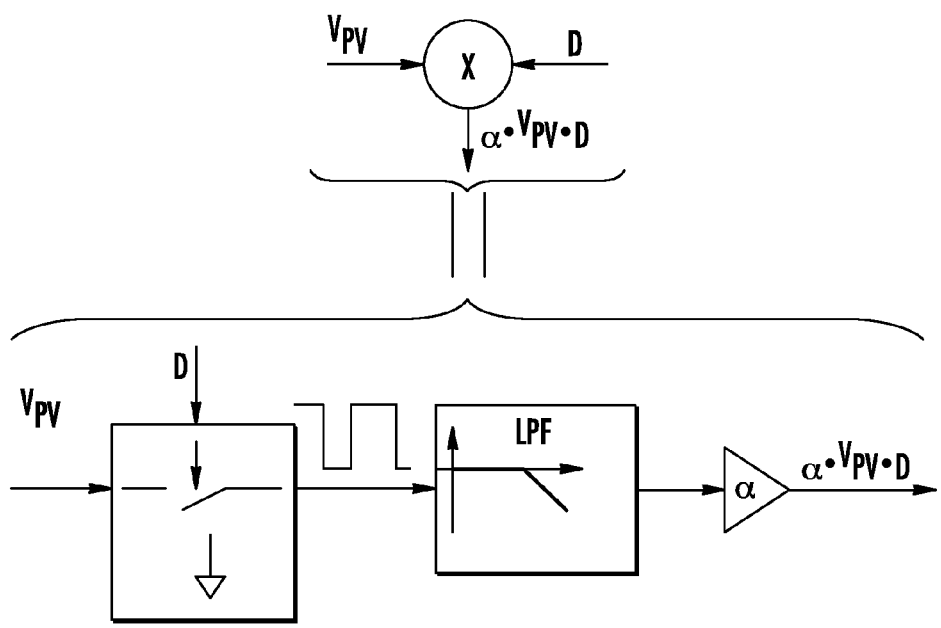
FIG. 4 is a block diagram of hardware for obtaining the product $V_{PV}*D$, according to the present invention.
Figure 5:
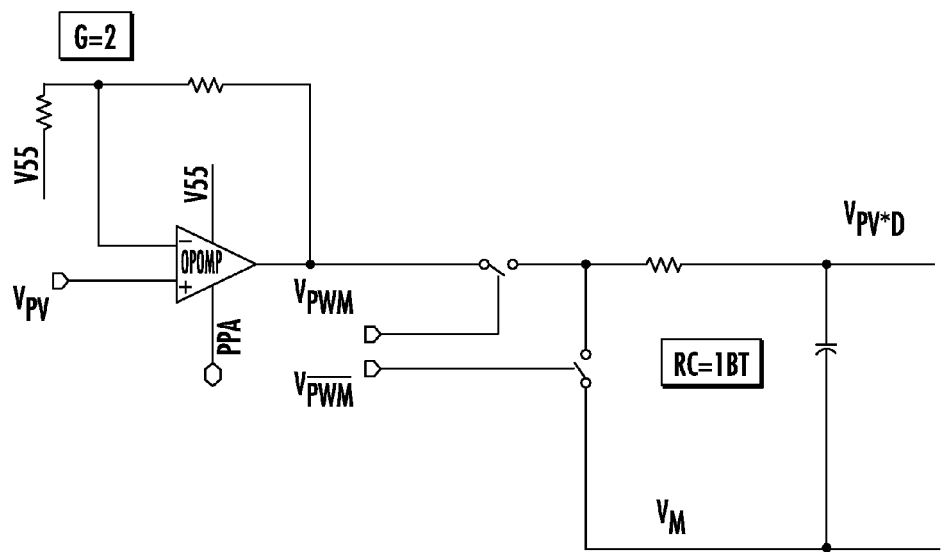
FIG. 5 is an analog circuit implementation of the functional diagram of FIG. 4.

A functional block diagram of hardware for performing such a multiplication is depicted in FIG. 4. FIG. 5 is an exemplary analog circuit for producing an output signal of amplitude proportional to the product $V_{PV}*D$. The PWM driving signal is the same waveform that is used to control the power switch of the DC-DC converter of the PV generation plant. The low-pass filter may be a simple RC first order circuit, whose time constant may be 5-10 times the period of the PWM driving signal in order to reduce spurious ripple at the output. Of course, an active low pass filter may alternatively be used.

The amplifier is placed before the input switching circuitry for decoupling reasons, without any effect in respect to the basic diagram of FIG. 4. $V_{PV}$ may be a scaled version of the panel(s) voltage, tapped from an ordinary voltage divider. Alternatively, and it can be directly coupled, thanks to the decoupling of the amplifier ($V_{PWM}$), and its inverted counterpart are used to switch between $V_{PV}$ and ground the input voltage of the low pass filter. At the output side of the filter, a voltage follower may be used to decouple this stage from the next one.

Figure 6A:
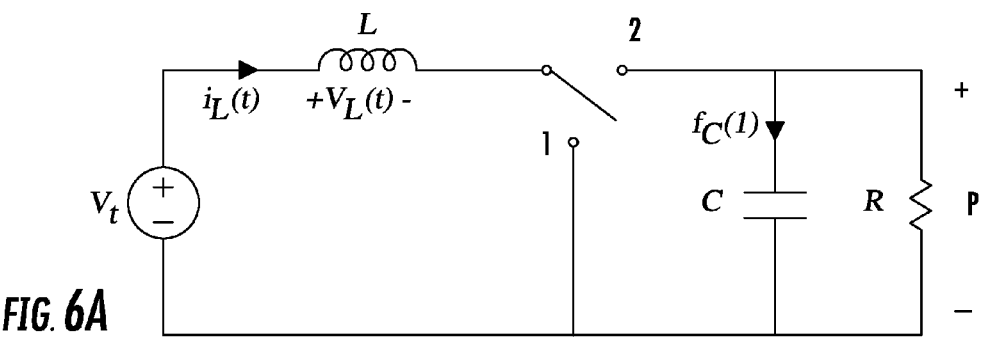
FIG. 6 depicts basic circuit diagrams of a boost converter: (a) with an ideal switch, (b) with an analog switching device, according to the present invention.
Figure 6B:
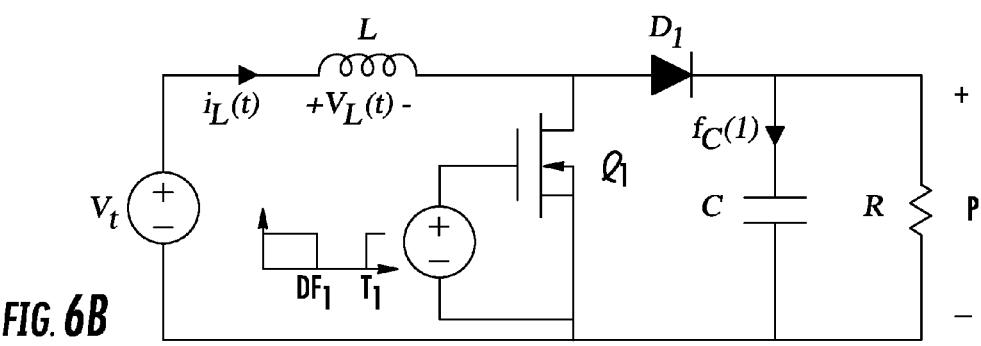

Short Term Average Output Current Monitoring
When the DC-DC converter works in CCM, the input current is large enough to be monitored as a voltage drop across a relatively small series resistance. Considering the case of a step-up (boost) converter depicted in FIG. 6: in (a) for an ideal switch and in (b) for a practical implementation with a MOSFET switch $Q_1$ in position 1) and a diode $D_1$ or any equivalent synchronous rectifier in position 2), during the ON time (switch in position 1), the current flowing through the MOSFET $Q_1$ is $I_{PV}$ (the same current that flows in the PV panel(s)) increases the energy stored in the inductor L. During the OFF time (switch in position 2), the stored energy is released through the diode $D_1$ to the output node, the voltage on which raises at a value higher than the input voltage.

Figure 7A:
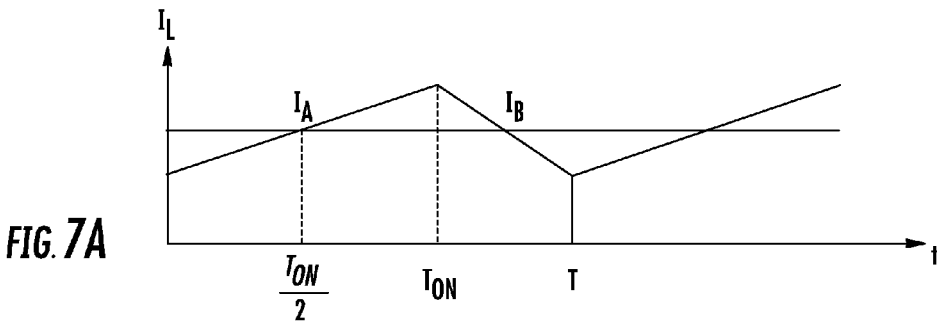
FIG. 7 shows waveforms of (a) input (inductor) current, (b) output diode current, (c) MOSFET switch current, according to the present invention.
Figure 7B:
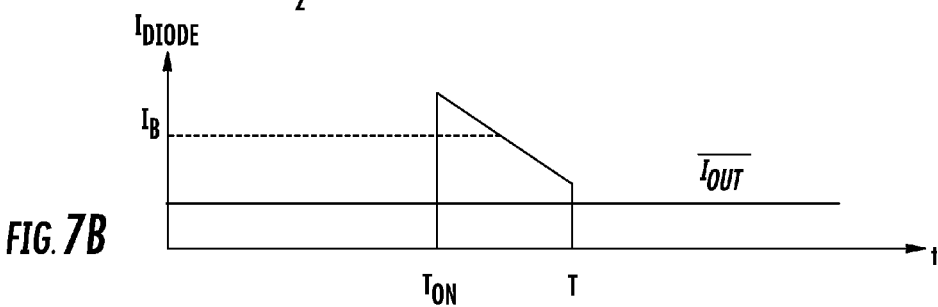
Figure 7C:
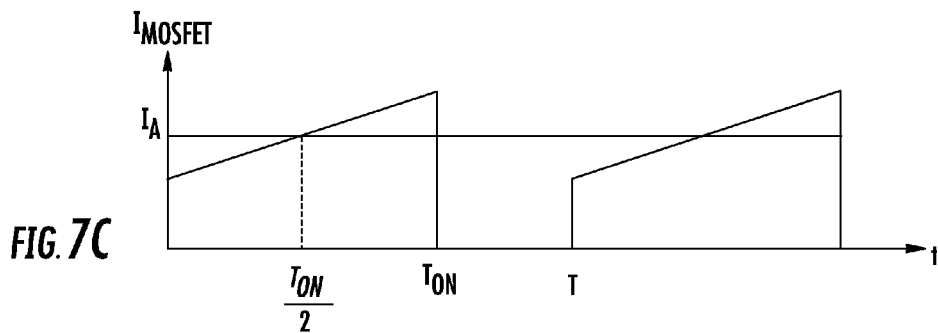

Of course, the MOSFET $Q_1$ has an intrinsic resistance $R_{DSON}$ when turned on, therefore $I_{PV}$ can be monitored as a voltage drop across $Q_1$ during ON times. The average output current is equal to the average current flowing through the diode that is given by the following equation:

$$\overline{I_{OUT}} = \frac{1}{2} I_B \cdot \frac{T_{OFF}}{T} = \frac{1}{2} I_B \cdot (1-D)$$

where $I_B$ is the median current flowing through the diode, as shown in FIG. 7, valid when the converter works in CCM. In fact, if the DC-DC converter works in DCM, the diode conduction time may be less than $T_{ON}$ because the diode conducts until its current is greater than zero. Thus, the above equation holds if $T_{OFF}$ means the effective diode conduction time rather than $T_{ON}$.

Figure 8:
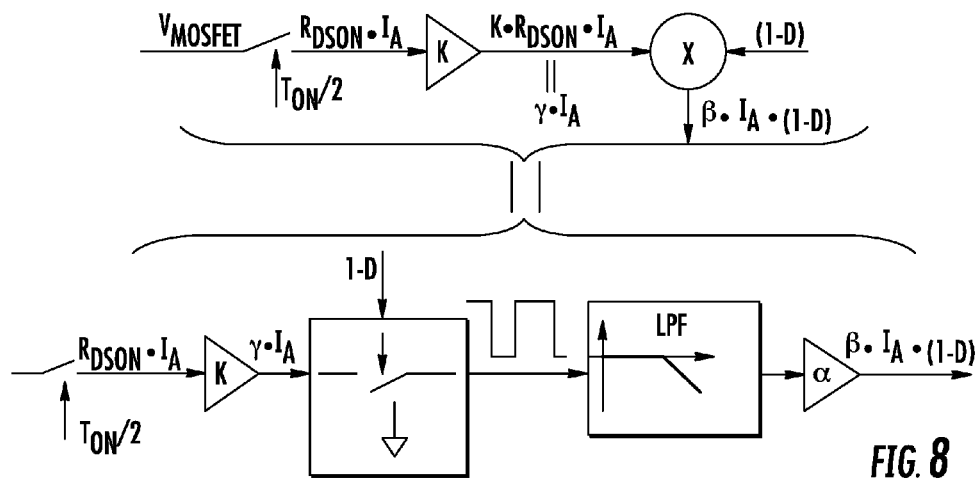
FIG. 8 is a block diagram of hardware for obtaining the product $I_A*(1-D)$, according to the present invention.

Furthermore $I_B$ is equal to the current $I_A$ flowing through the MOSFET at $T_{ON}/2$, as shown in FIG. 7. Thus the average output current can be monitored as the product between $(1-D)$ and the voltage drop across the MOSFET sampled at $T_{ON}/2$, which is equal to $(R_{DSON}*I_A)$. Similarly to the product $(V_{PV}*D)$, this multiplication may be performed by a circuit functionally defined in the block diagrams of FIG. 8. In this case, the monitored voltage drop may be amplified by a factor K, due to the necessarily low value of $R_{DSON}$ that for a MOSFET is typically in the range of few hundreds mΩ.

Figure 9:
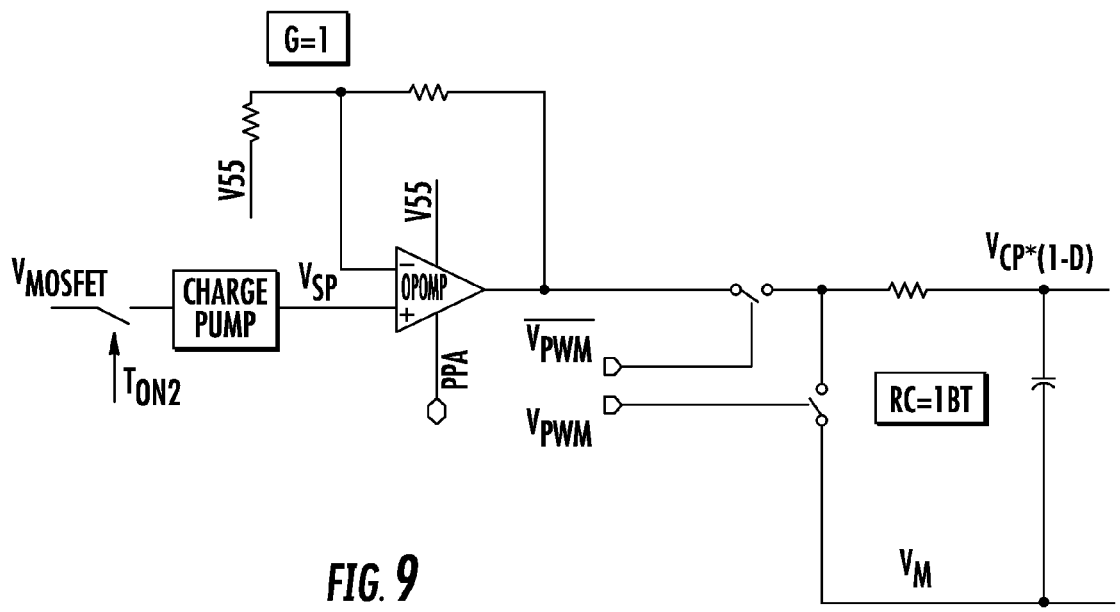
FIG. 9 is an analog circuit implementation of the functional diagram of FIG. 8.

FIG. 9 is an exemplary analog circuit for producing an output signal of amplitude proportional to the product of $I_B*(1-D)$. The circuit may utilize a charge pump at the input for periodically sampling the relatively small voltage drop across the MOSFET at $T_{ON}/2$ instants accumulating electrical charge for a certain number of PWM cycles for amplifying the detected voltage drop by a certain factor, in the considered sample embodiment by six. The resulting voltage, Vcp, is proportional to the current $I_A$ of the waveforms of FIG. 7. Then, an analog circuit, similar to that of FIG. 5, performs the product (Vcp*1D). The output product signal represents a scaled replica of the average output current of the DC-DC converter $I_{OUT}$, which tracks the input power trend as explained above.

A Core of the Analog P&O-MPP Tracker

Figure 10:
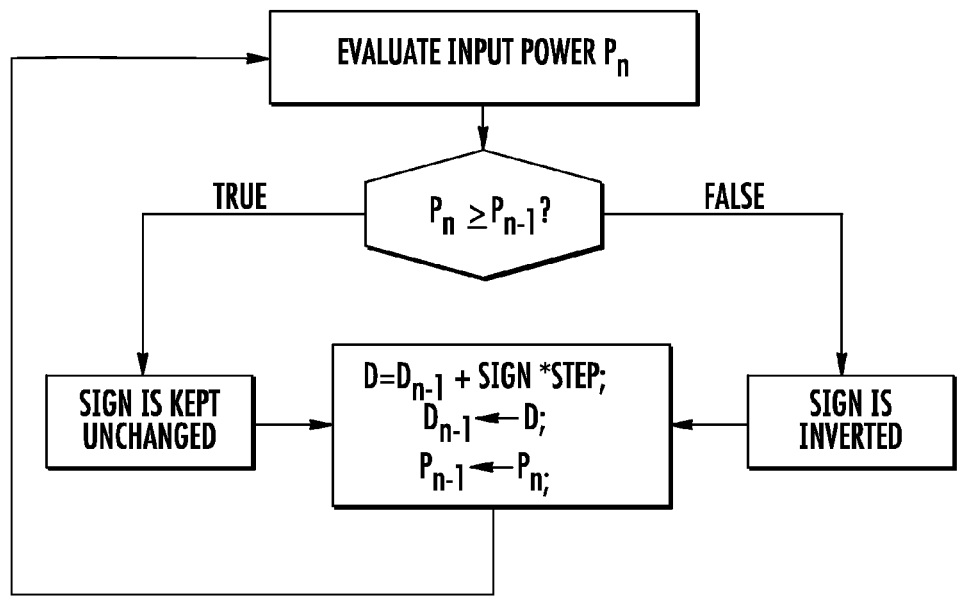
FIG. 10 is a P&O flow diagram of MPPT, according to the present invention.

A simple MPP tracker based on a Perturb & Observe algorithm may need to compare the power extracted from the PV panel at time $t_n$ with the power extracted at a precedent time $t_{n-1}$ in order to verify whether the duty cycle of the PWM signal that controls the power switch of the DC-DC converter is varying in the right direction, i.e. determining an increment of the power extracted from the PV panel(s) or not. It is assumed that the duty cycle variation is correct if it causes an increase of the input power of the converter, otherwise the duty cycle may vary in the opposite direction. FIG. 10 is a typical flow diagram of such a P&O algorithm.

Figure 11:
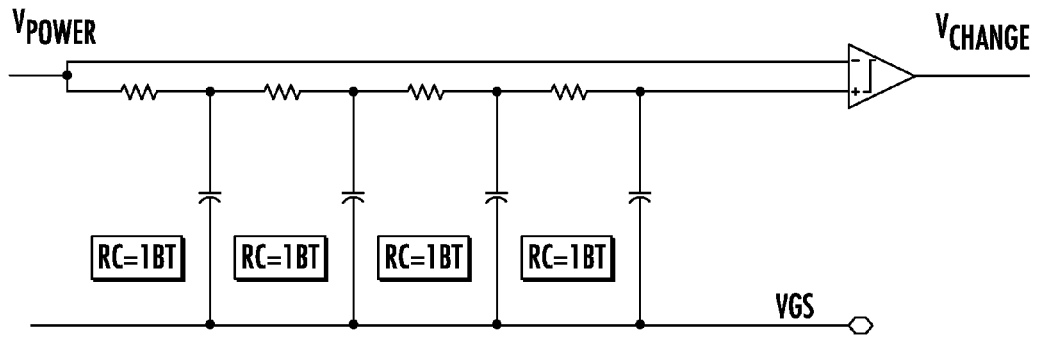
FIG. 11 is an analog circuit implementation of the MPP tracker, according to the present invention.

An effective embodiment of the core circuit of a fully analog implementation of a MPPT control in a PV generation plant of this disclosure is shown in FIG. 11. The circuit used to delay the product signals produced at the output of the analog circuits of FIG. 5 or of FIG. 9, that corresponds to the power currently extracted from the panel(s), here identified by the input voltage Vpower may be a distributed RC network, with time constants ranging from about 10 to 100 times the period of the PWM driving signal $V_{PWM}$. The current power value Vpower is applied to the inverting input of a comparator, and its delayed counterpart is applied to the non-inverting input. When the output of the comparator Vchange becomes high, it means that the direction of the duty cycle variation may be inverted in order to track the maximum power point of operation of the PV panel or panels of the generator plant. The number of RC elements in the network may be chosen in order to have the desired phase shift between the present value of power and its delayed version, sufficient to determine an appreciable voltage drop at the input terminals of the comparator.

The output of the comparator may be periodically sampled by a common D-type flip flop and the result used to trigger the output inversion of a second flip flop, each time the comparison output Vchange becomes high, that is to say each time the currently monitored power is less than its past value. The output of the second flip flop is used to control the slope sign of the reference voltage, Vref, generated by an integrator that is ordinarily compared with a triangular waveform to generate the PWM control waveform.

Optionally, a single RC element with a time constant large enough to filter also the lower frequency components introduced by the perturbation process may be used instead of a distributed RC network. The time constant should be between about 500 and 1,000 times the period of the PWM drive signal. In this case, the so filtered value of the input power signal Vpower may correspond to its time-averaged value, which may approach the maximum power when the MPP tracker circuit reaches steady state. The time-averaged value of power can be considered as a previous value of power.

A Whole MPPT Circuit

Figure 12:
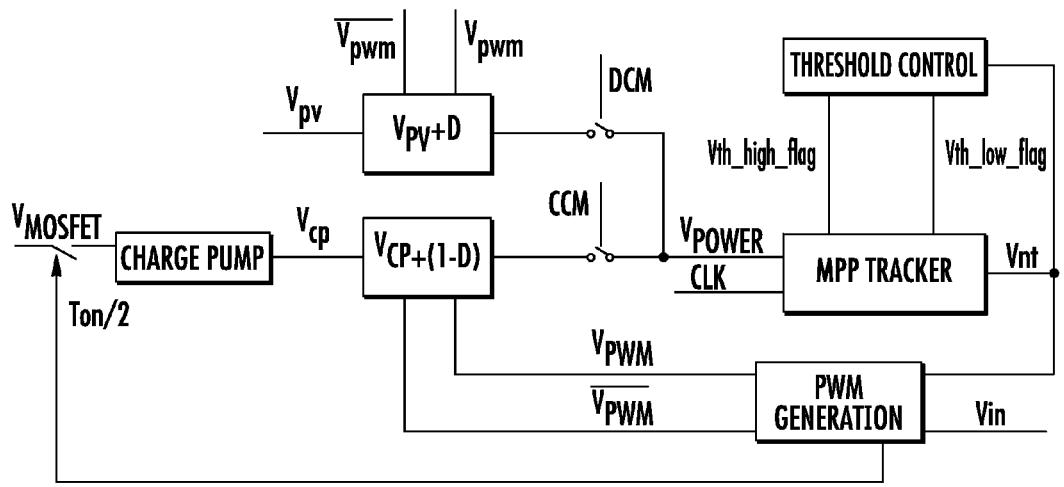
FIG. 12 is a basic functional block diagram of an exemplary MPPT controller, according to the present invention.

FIG. 12 is a basic block diagram of an exemplary embodiment of the MPPT controller. A zero crossing detector can be used to monitor the voltage drop across the diode or any other equivalent synchronous rectifier, and the produced "zero-crossing" flag is processed by any circuit adapted to implement a hysteresis (these ancillary circuits are not shown in the block diagram, being of immediate recognition by any ordinarily skilled technician).

The DC-DC converter may be considered in DCM only if the flag occurs for at least a pre-established number N of PWM cycles, and it may be considered in CCM if the flag remains absent for at least the same number N of PWM cycles. Thus, the hysteresis circuit carries out a "working-mode" flag processing that leads to select the pertinent one (Vpower) of the two product signals: $V_{PV}*D$ or $Vcp*(1-D)$, to be fed to the MPP tracker core circuit described above. Of course, both analog product signals: $V_{PV}*D$ and $Vcp*(1-D)$, are continuously generated by the respective blocks, but only one at the time of the two product signals is used, according to the "working-mode" selection signals CCM and DCM.

In fact, both analog multiplier block include a "memory" element, the capacitor of the output low pass filter, whose state of charge may track the resulting product quantity, in order to guarantee availability of a meaningful analog signal when their output is selected to feed the MPP tracker block.

Preferably, as shown in the exemplary diagram of FIG. 12, another control loop, realized by the block Threshold control, forces Vref to stay within a voltage range such that the duty cycle of the PWM generator block be constrained to vary between about 10% and 90%. The block PWM generator typically compares the input value Vref with a triangular waveform in order to generate the PWM driving signal $V_{PWM}$ that is used for controlling the step-up converter and the analog multiplication circuits of the blocks $V_{PV}*D$ and $Vcp*(1-D)$. The PWM generator block also produces a timing signal that is used at the input of the Charge pump block to sample the voltage drop on the power switch of the converter at $T_{ON}/2$ instants.

Of course, the complete circuitry may include other ordinary blocks for functions such as start-up, output voltage and/or current limiting and so on. These circuits not pertinent as far as fully understanding the technical characteristics and manners of practicing the disclosed embodiments.

REFERENCES

[1] Trishan Esram and Patrick L. Chapman, "*Comparison of Photovoltaic Array Maximum Power Point Tracking Techniques*", IEEE transactions on energy conversion, Vol. 22, NO. 2, June 2007.

[2] N. A. Lícia, C. F. Braz, and R. S. Selenio, "*Control integrated maximum power point tracking methods*", in Proc. 16th Eur. Photovolt. Solar Energy Conf., May 2000, pp. 2582-2585.

[3] D. P. Hohm and M. E. Ropp, "*Comparative study of maximum power point tracking algorithms*", in Proc. Photovolt.: Res. Appl., April 2003, pp. 47-62.

[4] Ashish Pandey, Nivedita Dasgupta and Ashok K. Mukerjee, "*A Simple Single-Sensor MPPT Solution*", IEEE transactions on power electronics, Vol. 22, NO. 2, March 2007.

[5] Dezso Sera, Tamas Kerekes, Remus Teodorescu and Frede Blaabjerg, "*Improved MPPT Algorithms for Rapidly Changing Environmental Conditions*", Power Electronics and Motion Control Conference, 2006. EPEPEMC 2006. 12th International, Aug. 30, 2006-Sep. 1, 2006 Page(s): 1614-1619.

[6] Chihchiang Hua, Member, IEEE, Jongrong Lin, and Chihming Shen, "*Implementation of a DSP-Controlled Photovoltaic System with Peak Power Tracking*", IEEE transactions on industrial electronics, Vol. 45, NO. 1, February 1998.

[7] John Charais, "*AN1211—Maximum Power Solar Converter*", Microchip Technology Inc.: Application note DS01211A, 2008.

[8] Cesare Alippi and Cristian Galperti, "*An Adaptive System for Optimal Solar Energy Harvesting in Wireless Sensor Network Nodes*", IEEE Transactions on circuits and systems-i: regular papers, Vol. 55, NO. 6, July 2008.

[9] R. Leyva, C. Alonso, I. Queinnec, A. Cid-Pastor, D. Lagrange, L. Martínez-Salamero, "*MPPT of Photovoltaic Systems using Extremum-Seeking Control*", IEEE transactions on aerospace and electronic systems, Vol. 42, NO. 1 January 2006.

[10] Yongho Kim, Hyunmin Jo, and Deokjung Kim, "*A new peak power tracker for cost-effective photovoltaic power system*", Energy Conversion Engineering Conference, 1996. IECEC 96. Proceedings of the 31st Intersociety, Volume 3, 11-16 Aug. 1996 Page(s): 1673-1678 vol. 3.

The invention claimed is:

1. A method of analog maximum power point tracking in a photovoltaic power generation device including a DC-DC converter for an output voltage of at least one panel controlled by a pulse width modulated (PWM) drive signal of a variable duty-cycle generated by a PWM control circuit, the method comprising:

detecting whether the DC-DC converter is in one of a discontinuous conduction mode (DCM) and a continuous conduction mode (CCM), the photovoltaic power generation device switching between the DCM and the CCM based upon a load condition of the DC-DC converter;

analog multiplying of a current voltage at panel terminals by a time ratio of a current duty-cycle of the PWM drive signal for producing a first analog product signal corresponding to a current power output from the at least one panel when the DC-DC converter is in DCM;

analog multiplying of a magnitude signal representing a voltage drop of the DC-DC converter during conduction phases by a voltage gain factor and low pass filtering a result signal for producing a second analog product signal corresponding to a current power output to an electrical load of the DC-DC converter when in CCM;

comparing a first input signal, the first input signal being selected from one of the first and second analog product signals as representing an actual current power output from the at least one panel, with a second input signal, the second input signal comprising one of a delayed replica of the first input signal and a time averaged value of the first input signal, the comparing for determining when the second input signal becomes greater than the first input signal and for outputting a flag signal thereupon; and inverting a sign of variation of the duty-cycle of the PWM drive signal when the second input signal becomes greater than the first input signal.

2. The method of claim 1 wherein the at least one panel comprises a plurality thereof being series-parallel connected.

3. A method of power point tracking in a photovoltaic power generation device including a DC-DC converter for an output voltage of at least one panel controlled by a pulse width modulated (PWM) drive signal, the method comprising:

detecting whether the DC-DC converter is in one of a discontinuous conduction mode (DCM) and a continuous conduction mode (CCM);

analog multiplying of a current voltage at panel terminals by a current duty-cycle of the PWM drive signal for producing a first analog product signal corresponding to a current power output from the at least one panel when the DC-DC converter is in DCM;

analog multiplying of a magnitude signal representing a voltage drop of the DC-DC converter during conduction phases by a voltage gain factor and low pass filtering a result signal for producing a second analog product signal corresponding to a current power output to an electrical load of the DC-DC converter when in CCM;

comparing a first input signal, the first input signal being selected from one of the first and second analog product signals as representing an actual current power output from the at least one panel, with a second input signal, the comparing for determining when the second input signal becomes greater than the first input signal and for outputting a flag signal thereupon; and inverting a sign of variation of the duty-cycle of the PWM drive signal when the second input signal becomes greater than the first input signal.

4. The method of claim 3 wherein the photovoltaic power generation device switches between the DCM and the CCM based upon a load condition of the DC-DC converter.

5. The method of claim 3 wherein the second input signal comprises one of a delayed replica of the first input signal and a time averaged value of the first input signal.

6. The method of claim 3 wherein the at least one panel comprises a plurality thereof being series-parallel connected.

7. The method of claim 3 further comprising performing a maximum power point tracking (MPPT) operation.

8. An analog maximum power point tracking circuit for a photovoltaic power generation device including a DC-DC converter of a voltage at terminals of a plurality of panels having a power switch controlled by a pulse width modulated (PWM) drive signal of variable duty-cycle generated by a PWM control circuit, the analog maximum power tracking circuit comprising:

a detector for detecting whether the DC-DC converter is in one of a discontinuous conduction mode (DCM) and a continuous conduction mode (CCM), the photovoltaic power generation device switches between the DCM and the CCM based upon a load condition of the DC-DC converter;

a first analog multiplier circuit of a current voltage at panel terminals by a time ratio of a current duty-cycle of the PWM drive signal of the power switch for producing a first analog product signal representing a current power output from the at least one panel when the DC-DC converter is in the DCM;

a charge pump input stage for sampling a voltage drop on the power switch of the DC-DC converter during conduction phases for producing an output voltage of cumulative level for a pre-established number of PWM cycles, said charge pump input stage including a second analog multiplier circuit for multiplying the output voltage by a complementary value of a time ratio of the current duty-cycle of the PWM drive signal for producing a second analog product signal representing a current power output absorbed by a load of the DC-DC converter when in the CCM;

an analog power tracking circuit including a comparator of a first input signal, the first input signal being selected between the first and second analog product signals for being an actual power output, with a second input signal, the second input signal comprising at least one of a delayed replica of the first input signal and a time averaged value of the first input signal, the comparing for determining when the second input signal becomes greater than the first input signal and for outputting a flag signal thereupon; and an inverter circuit for inverting a sign of variation of the duty-cycle of the PWM drive signal based upon by the flag signal.

9. The analog maximum power point tracking circuit of claim 8 wherein said analog power tracking circuit includes a distributed RC network, the RC network having time constants between 10 and 100 times a period of the PWM drive signal and being connected to an input of the comparator for delaying the replica of the first input signal.

10. The analog maximum power point tracking circuit of claim 8 wherein said analog power tracking circuit includes a single RC input circuit having a time constant between 500 and 1,000 times a period of the PWM drive signal, said single RC input circuit being connected to an input of the comparator for providing the time averaged value of the first input signal.

11. The analog maximum power point tracking circuit of claim 8 wherein the DC-DC converter is a step-up converter using a synchronous rectifier through which energy stored in a reactive element of the DC-DC converter during ON phases of the power switch transfers to the load of the DC-DC converter.

12. The analog maximum power point tracking circuit of claim 11 further comprising a monitoring circuit configured to monitor a sign of a bias of said synchronous rectifier, said monitoring circuit configured to flag the DCM when said synchronous rectifier is reverse biased during OFF phases of the power switch of the DC-DC converter.

13. The analog maximum power point tracking circuit of claim 11 wherein said synchronous rectifier comprises a diode.

14. The analog maximum power point tracking circuit of claim 8 wherein the power switch of the DC-DC converter is a metal-oxide-semiconductor field-effect transistor (MOSFET).

15. A power point tracking circuit for a photovoltaic power generation device including a DC-DC converter of a voltage at terminals of at least one panel controlled by a pulse width modulated (PWM) drive signal, the power tracking circuit comprising:

a detector for detecting whether the DC-DC converter is in one of a discontinuous conduction mode (DCM) and a continuous conduction mode (CCM);

a first analog multiplier circuit of a current voltage at panel terminals by a current duty-cycle of the PWM drive signal for producing a first analog product signal representing a current power output from the at least one panel when the DC-DC converter is in the DCM;

a charge pump input stage for sampling a voltage drop on the DC-DC converter during conduction phases for producing an output voltage of cumulative level for a pre-established number of PWM cycles, said charge pump input stage including a second analog multiplier circuit for multiplying the output voltage by a complementary value of the current duty-cycle of the PWM drive signal for producing a second analog product signal representing a current power output absorbed by a load of the DC-DC converter when in the CCM;

an analog power tracking circuit including a comparator of a first input signal, the first input signal being selected between the first and second analog product signals for being an actual power output, with a second input signal, the comparing for determining when the second input signal becomes greater than the first input signal and for outputting a flag signal thereupon; and an inverter circuit for inverting a sign of variation of the duty-cycle of the PWM drive signal based upon by the flag signal.

16. The power point tracking circuit of claim 15 wherein the photovoltaic power generation device switches between the DCM and the CCM based upon a load condition of the DC-DC converter.

17. The power point tracking circuit of claim 15 wherein the second input signal comprises one of a delayed replica of the first input signal and a time averaged value of the first input signal.

18. The power point tracking circuit of claim 15 wherein the at least one panel comprises a plurality thereof being series-parallel connected.

19. The power point tracking circuit of claim 17 wherein said analog power tracking circuit includes a distributed RC network, the RC network having time constants between 10 and 100 times a period of the PWM drive signal and being connected to an input of the comparator for delaying the replica of the first input signal.

20. The power point tracking circuit of claim 17 wherein said analog power tracking circuit includes a single RC input circuit having a time constant between 500 and 1,000 times a period of the PWM drive signal, said single RC input circuit being connected to an input of the comparator for providing the time averaged value of the first input signal.

21. The power point tracking circuit of claim 15 further comprising a hysteresis flag processing circuit for validating a DCM recognition when the flag signal occurs for at least a number of successive PWM cycles, and a CCM recognition when the flag is absent for at least the number of successive PWM cycles.

22. The power point tracking circuit of claim 15 further comprising a threshold control circuit for:
comparing a reference voltage with a triangular waveform for generating the PWM drive signal; and
keeping the reference voltage within a voltage range to limit a range of variation of the duty-cycle between 10% and 90%.

* * * * *